Patented July 4, 1939

2,164,476

UNITED STATES PATENT OFFICE 2,164,476

METHOD OF MAKING ABRASIVE ARTICLES BY MEANS OF PRECOATED GRAIN

Arthur G. Scutt, Niagara Falls, N. Y., assignor, by mesne assignments, to The Carborundum Company, Niagara Falls, N. Y., a corporation of Delaware No Drawing. Application March 15, 1935, Serial No. 11,318

6 Claims. (Cl. 51—278)

This invention relates to an improved method for making abrasive articles of bonded abrasive grain, and to the products so made, one purpose of the invention being to improve the tenacity with which the grains are held by the bond.

This invention applies more particularly to granules with surfaces of low adhesive characteristics.

It is well known in the art of abrasives that maximum effectiveness in cutting by the abrasive grains is obtained when the bond which holds these grains or in which the same are embedded frees the grains as soon as but no sooner than they have become worn or dulled so as to lose their effectiveness. Generally, care must be taken to render the abrasive articles sufficiently friable so that dulled grains are not held firmly so as to continue to plow along the surfaces of the work piece after these dulled particles should have been torn loose from their setting. This is partly because most of the abrasive grains used in this art have surfaces to which the bond, such as a heat hardenable resin, will adhere; so that even after the bond is sufficiently worn away so that the dulled grain is no longer embedded, or mostly depressed below the surface, there is strong adhesion on the part of the bond to the projecting grain.

Some types of abrasive grains, on the other hand, do not have surfaces which afford good adhesion with respect to the bond employed for making the article. This is particularly true with diamond particles whose surfaces are generally remarkably glassy and smooth in texture. The diamonds tend to fracture along cleavage planes, leaving surfaces which are remarkably free from pits or roughnesses. This characteristic, in conjunction with the extreme hardness of diamond particles which renders their cutting lives unusually long, makes it highly desirable to maintain the diamond particles mounted at the surface of the abrasive articles by an unusually tenacious bond. Accordingly, it is not desirable that the finished article be as friable as is the ordinary abrasive article.

In accordance with this invention the abrasive particles which have surfaces of low adhesive characteristic with respect to the bond are mixed with a resin (which may or may not be the same as the bond) and pressure applied so as to bring the resin into intimate contact with all portions of the particles and to embed the same therein. It is best to use sufficient resin to at least fill all the voids between particles and thus provide a flowable mixture. The resin generally employed is a heat hardenable resin; and it is preferred to use a resin of the phenol-formaldehyde condensation product type which is sold under the trade name "Bakelite". The following is one example of a formula for a typical mixture, the proportions being by weight:

|  | Percent |
|---|---|
| Diamond grit from 80 to 200 mesh (i. e., particles which pass through an 80 mesh screen but are held on a 200 mesh screen) | 70 |
| Phenol-formaldehyde resin (a mixture in equal parts of the resins sold under the trade-mark "Bakelite" resins No. 2417 and No. 2428) | 30 |

By application of heat and pressure, the mixture of abrasive particles and heat hardenable resin is set to a hard mass. It is found particularly desirable to use sufficiently high pressure so that the resin is driven into any slight unevenness, such as recesses, which may occur in the surfaces of the abrasive particles. For example, this may be 6000 pounds per square inch at 350° F. for a phenol-formaldehyde condensation product resin.

The resulting mass is then disentegrated; but such resin as finds its way into the uneven portions of the surfaces of the granules tends to adhere. The granules may or may not be separated from the excess resin, depending on whether the excess resin is desired as a filler in the end product. The granules are now ready for making up into an abrasive article in the usual way. For instance, if an abrasive article having as a bond a phenol-formaldehyde condensation product resin is desired, the granules obtained upon disintegration of the above referred to mass of grain and hardened resin may be mixed up with additional resin, with or without a filler such as magnesia, flint or the like as desired, and molded in the customary manner by the aplication of heat and pressure. The following are examples of mixtures (the proportions being by weight) which have been found to give good results:

I. A mixture in equal parts of phenol-formaldehyde resins, sold under the trade-mark "Bakelite" resins No. 2417 and No. 2428 was used in the proportions of 3 parts resin mixture to 7 parts grit for coating the diamond grit (from 80 to 200 mesh, as specified in a previous example).

|  | Percent |
|---|---|
| The above mixture cured and then crushed | 40 |
| Resin mixture ("Bakelite" No. 2417 and No. 2428) in the reactive stage | 30 |
| Magnesia | 30 |

II. A resin of the alkyd type sold under the trade-mark "Glyptal" No. 1340 was used in the proportions of 3 parts resin to 7 parts grit for coating the diamond grit (from 80 to 200 mesh) the resin being further heat hardened by oven baking over a period of 96 hours during which time the temperature was raised to 350° F.

|  | Percent |
|---|---|
| The above cured mixture in a crushed condition | 40 |
| Resin mixture (of No. 2417 and No. 2428 "Bakelite") in the reactive stage | 30 |
| Magnesia | 30 |

III. A mixture of "Bakelite" resins No. 2417 and No. 2428 together with a filler of finely divided iron oxide or rouge was used for coating the diamond grit (from 80 to 200 mesh). The mixture was in the following proportions by weight:

|  | Percent |
|---|---|
| Diamond grit | 60 |
| Resin mixture | 30 |
| Rouge | 10 |

The above mixture after being heat-hardened (under high pressure) and then crushed was bonded as follows:

|  | Percent |
|---|---|
| Crushed mixture of resin and diamond grit | 40 |
| Resin mixture ("Bakelite" Nos. 2417 and 2428) in the reactive stage | 30 |
| Magnesia | 30 |

This method has the advantage that, in forcing the resin into intimate contact with the various surfaces of the particles, an extremely high pressure may be employed, for instance 6000 pounds per square inch or over. This pressure is not the pressure which determines the porosity of the final product. The pressures of from 1000 to 2000 pounds per square inch which have been used in the prior art in the manufacture of abrasive wheels have been generally used for the final forming of the abrasive article. This is also the order of magnitude of the pressure that the applicant uses in the final forming of his abrasive article. It will therefore be apparent that although the resin may be caused to adhere with great tenacity to the diamond particles, the porosity of the abrasive article itself, which is dependent in considerable measure upon the heat and pressure employed during the molding of the article, may be varied to suit the product desired. The resin which has been driven under high pressure into the minute surface irregularities of the particles and hardened while under such pressure is a great advantage, since the bond employed in making the abrasive article itself adheres thereto. Thus the particles with adhering resin are of themselves a novel and useful improvement over the prior art. Such particles may be stored indefinitely, or prepared and sold to the trade generally. Such particles are therefore claimed as a part of this invention.

The abrasive article itself which is made in accordance with this invention has also distinct advantages, due to the tenacity with which the abrasive particles are gripped and held to the body of the abrasive article. The product of this improved process therefore forms a part of the present invention.

It would, in many instances, be disadvantageous to apply as high a pressure as 6000 pounds per square inch in molding to finished condition an abrasive wheel of this character. Some of the abrasive particles would be crushed, so that the fineness of the particles in the finished article would be indeterminate and generally not of the proper grit size.

A further advantage is found in the ability of the finished product to withstand changes in temperature. The resin which is forced into such intimate contact has substantially the same coefficient of thermal expansion as the resin which is used as the bond, and this minimizes difficulties due to expansion and contraction with changes in temperature in the abrasive article.

I claim:

1. In a method of making an abrasive article comprising a resin and granules with surfaces of low adhesive characteristics with respect to said resin, the steps consisting in mixing the particles and a resin of the phenol formaldehyde condensation product type, setting the mixture under heat and at pressures sufficiently exceeding 5000 pounds per square inch to force the resin into any uneven portions of the surfaces of the particles, disintegrating the resulting mass and separating granules with adhering resin, mixing the last mentioned granules with a resin bond in sufficient amount to produce a substantially non-porous article on the application of high pressure, and molding the last mentioned mix under heat and pressure.

2. In the method of making an abrasive article comprising diamond particles and a bond of synthetic resin, the steps consisting in mixing the particles and a resin of the phenol-formaldehyde condensation product type, setting the mixture under heat and at pressures sufficiently exceeding 5000 pounds per square inch to force the resin into uneven portions such as recesses in the surfaces of the particles, disintegrating the resulting mass and separating granules with adhering resin, mixing the last mentioned granules with a bond of phenol-formaldehyde condensation product resin in sufficient amount to produce a substantially non-porous article on the application of high pressure, molding the last mentioned mix, and hardening the same with heat.

3. The method of making an abrasive article which comprises mixing diamond particles with a smaller mass of reactive phenolic condensation product resin, pressing the mixture at pressures exceeding 5000 pounds per square inch and curing the resin in intimate contact with the diamond particles at the hardening temperature of the resin, disintegrating the compressed and hardened mass into small masses containing diamond particles and adherent hard resin, forming a mixture of said small masses with a somewhat larger mass containing reactive phenol condensation product resin and an alkaline earth oxide filler, molding said last mentioned mix at pressures substantially less than said first mentioned pressures, and curing the reactive resin to make an integral abrasive article.

4. The method of making an abrasive article which comprises mixing diamond particles with a smaller mass of reactive phenolic condensation product resin, pressing the mixture at pressures exceeding 5000 pounds per square inch and curing the resin in intimate contact with the diamond particles at the hardening temperature of the resin, disintegrating the compressed and hardened mass into small masses containing diamond particles and adherent hard resin, forming a mixture of said small masses with a somewhat larger mass containing reactive phenol condensation product resin and magnesia, molding said last mentioned mix at pressures substantially less than said first mentioned pressures, and curing the reactive resin to make an integral abrasive article.

5. A mix for molding abrasive articles comprising diamond particles with closely adherent heat hardened phenol condensation product resin that was cured in situ while under pressures of more than 5000 pounds per square inch, an alkaline earth oxide filler, and a bonding material composed of reactive phenol condensation product resin.

6. The method of making an abrasive article which comprises mixing diamond particles with a smaller mass of reactive phenol condensation product resin, pressing the mixture at pressures of the order of magnitude of 6000 pounds per square inch and curing the resin in intimate contact with the diamond particles at the hardening temperature of the resin, disintegrating the compressed and consolidated mass into small masses containing diamond particles and adherent hard resin, removing the excess resin which is not attached to diamond particles, forming a mixture of the diamond particles and adherent resin with a somewhat larger mass consisting of reactive phenol condensation product resin and an alkaline earth oxide, molding said last mentioned mix at pressures considerably less than 6000 pounds per square inch, and curing the reactive resinous constituents of the bond at temperatures exceeding 300° F.

ARTHUR G. SCUTT.